Figure 1:
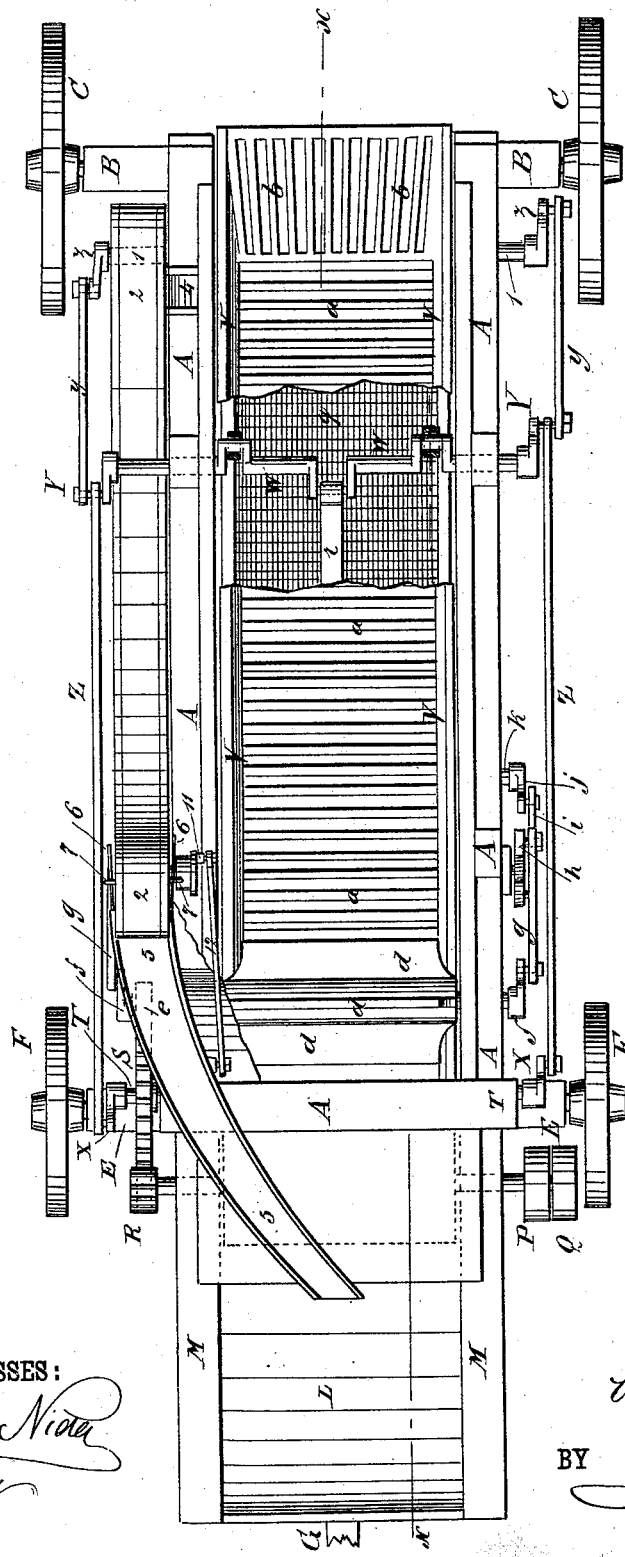

(No Model.) 4 Sheets—Sheet 1.

W. L. MULLER.
GRAIN THRASHER AND SEPARATOR.

No. 280,066. Patented June 26, 1883.

WITNESSES:
Chas. Nider
C. Sedgwick

INVENTOR:
W. L. Muller
BY Munn & Co.
ATTORNEYS.

(No Model.) 4 Sheets—Sheet 2.
W. L. MULLER.
GRAIN THRASHER AND SEPARATOR.
No. 280,066. Patented June 26, 1883.
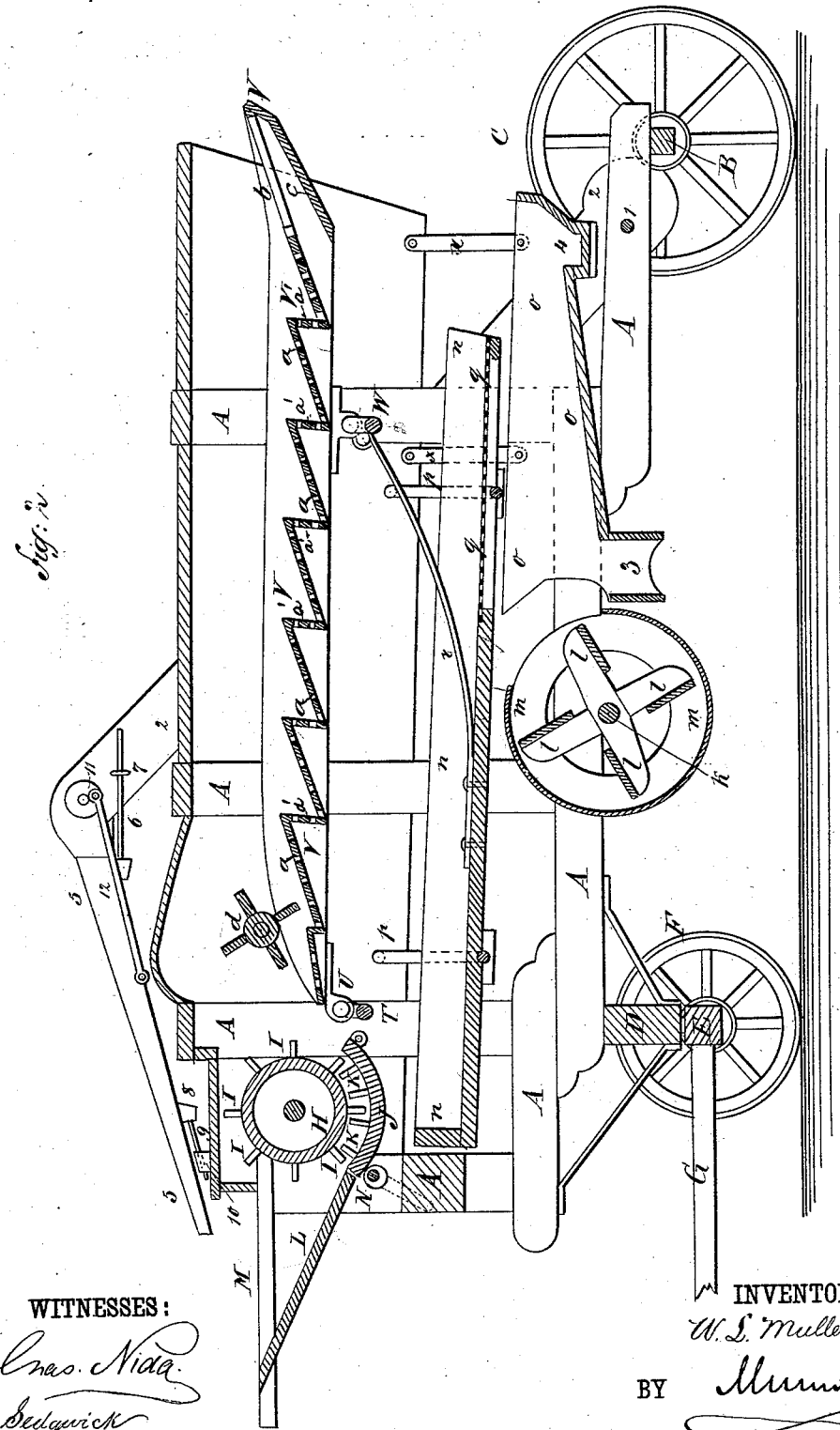
WITNESSES:
Chas. Nida
C. Sedgwick
INVENTOR:
W. L. Muller
BY
ATTORNEYS.

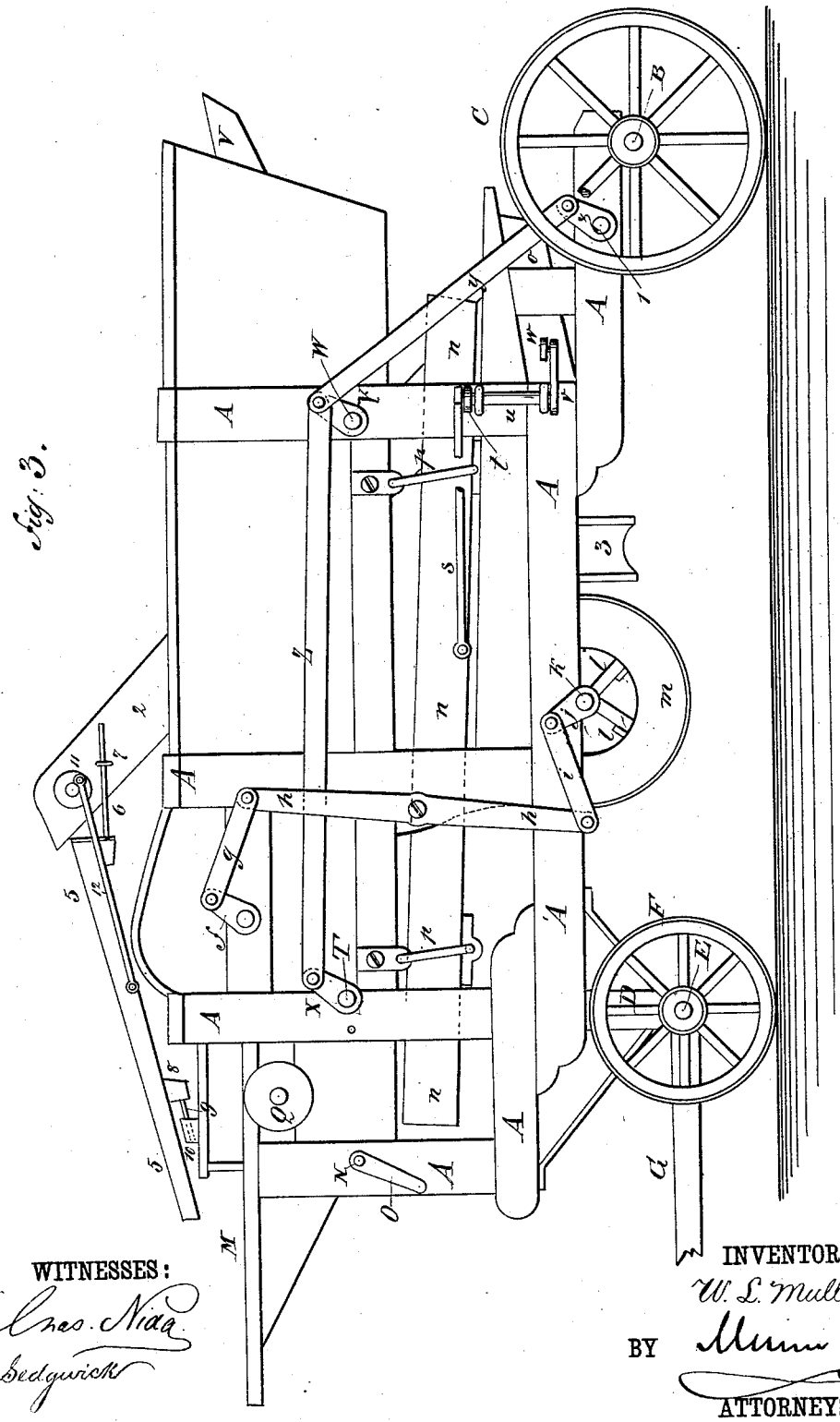

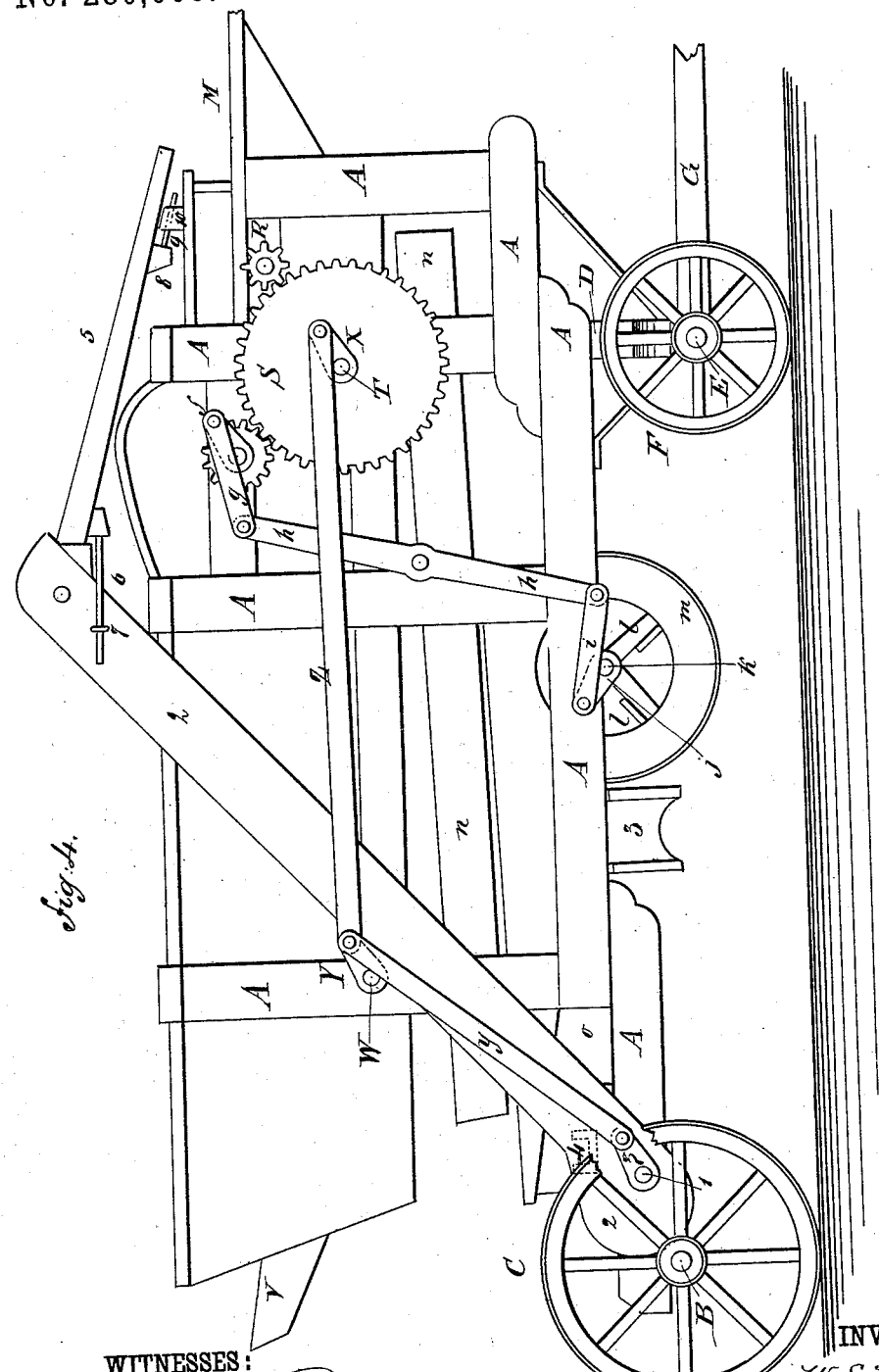

UNITED STATES PATENT OFFICE.

WILLIAM L. MULLER, OF MUSCODA, WISCONSIN.

GRAIN THRASHER AND SEPARATOR.

SPECIFICATION forming part of Letters Patent No. 280,066, dated June 26, 1883.

Application filed February 7, 1883. (No model.)

*To all whom it may concern:*

Be it known that I, WILLIAM LEONARD MULLER, of Muscoda, in the county of Grant and State of Wisconsin, have invented a new and useful Improvement in Grain Thrashers and Separators, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement, parts being broken away. Fig. 2, Sheet 2, is a longitudinal sectional elevation of the same, taken through the broken line $x\,x$, Fig. 1. Fig. 3, Sheet 3, is an elevation showing one side of the machine. Fig. 4, Sheet 4, is an elevation showing the other side of the machine.

The object of this invention is to facilitate the thrashing of grain and the separation of the grain, straw, and chaff.

A is the frame of the machine, the rear end of which rests upon and is secured to the axle B of the rear wheels, C. The forward part of the frame A rests upon and is secured to the bolster D, which is pivoted to the axle E of the forward wheels, F. The bolster D is made high and the wheels F are made small, so that the said wheels can pass in beneath the frame A, to allow the machine to be turned in a small space.

In the upper forward part of the frame A is journaled the thrashing-cylinder H, which is made larger and heavier than the cylinders of ordinary thrashers, and is provided with teeth I, longer than ordinary thrasher-teeth.

J is the concave, the teeth K of which are made correspondingly long. The concave J is hinged at its rear edge to the frame A in such a position that the forward edge of the said concave will be at the lower edge of the feed-table L, which is inclined and attached in the ordinary manner to the forward end of the frame A and to arms M, attached to the said end. The forward part of the concave J rests upon on eccentric-shaft, N, or upon eccentrics formed upon or attached to the said shaft, so that the said concave can be adjusted by turning the said eccentric-shaft N. The eccentric-shaft N rocks in bearings in the frame A, and to one of its ends is attached a lever, O, by means of which the said shaft can be readily adjusted.

To one of the journals of the cylinder H are attached a fast pulley, P, and a loose pulley, Q, to receive a driving-belt or gear-wheels, as the power to be used may require. To the other journal of the cylinder H is attached a small gear-wheel, R, the teeth of which mesh into the teeth of the large gear-wheel S, attached to the crank-shaft T. The shaft T revolves in bearings in the frame A, and the long crank formed upon its middle part revolves in bearings U, attached to the end of the separator V.

To the lower side of the rear part of the separator V are attached bearings, in which revolves the long crank formed upon the shaft W. The crank-shaft W revolves in bearings in the frame A.

To the ends of the crank-shafts T W are attached cranks X Y, the cranks on opposite ends of each shaft being at right angles to each other, which are connected by bars Z, as shown in Figs. 1, 3, and 4, so that the two crankshafts T W will revolve together to give a downward, forward, upward, and rearward movement to the separator V, and cause the said separator to shake the loose grain out of the straw and carry the said straw to the rearward. The bottom of the separator is formed with a series of angular perforated offsets or steps, $a\,a'$, and is made of slats or has openings formed through it, so that the said separator will be more effective in separating the loose grain from the straw and in carrying the straw to the rearward, and will allow the grain to pass through it readily. The rear part of the bottom of the separator V is formed of slats $b$, placed lengthwise of the separator and inclined upward, as shown in Fig. 2.

To the rear part of the separator V, beneath the inclined slats $b$, is placed an inclined apron, $c$, to guide the grain that may fall through the spaces between the slats $b$ back into the machine.

Above the forward end of the separator V, and a little in the rear of the cylinder H, is placed the beater $d$, which is formed by attaching radial wings to a shaft, and by which the loose grain is beaten and shaken out of the straw, and the said straw is pushed upon the said separator, so as to be carried back by the separator in its movements. The journals of the beater $d$ revolve in bearings in the frame A, and to one of the said journals is attached a small gear-wheel, $e$, the teeth of which mesh into the teeth of the large gear-wheel S, so that the beater will be driven from the thrashing-cylinder H.

To the journals of the beater $d$ are attached cranks $f$, to which are pivoted the ends of connecting-bars $g$. The other ends of the connecting-bars $g$ are pivoted to the upper ends of the levers $h$, which are pivoted at their middle parts to the frame A, and to their lower ends are pivoted the ends of connecting-bars $i$. The other ends of the connecting-bars $i$ are pivoted to the cranks $j$, attached to the journals of the fan-shaft $k$, the fans $l$ of which are inclosed in a case, $m$, in the manner of an ordinary fan-blower. As the grain falls from the separator V it is received upon the inclined conveyer $n$, down which it slides to the shoe $o$ of the cleaner. The conveyer $n$ has flanges upon its side edges and forward end to prevent the grain falling off at the said edges, and is hung from the frame A by hinged bars or cranks $p$. The conveyer $n$ extends over the cleaner-shoe, and the part of its bottom above the said shoe is formed of a screen, $q$, having meshes of such a size as will allow the grain to pass through and drop into the said shoe, while the chaff is blown out at the rear end of the machine, and coarse impurities that will not pass through the screen $q$ fall from the rear end of the said screen.

To the bottom of the conveyer $n$ is attached the end of the bar $r$, the other end of which is hinged to a crank formed upon the middle part of the crank-shaft W, so that the said conveyer will be vibrated by the revolution of the said crank-shaft.

To one side of the conveyer $n$ is attached the forward end of a connecting-rod, $s$, the rear end of which is hinged to an outwardly-projecting crank, $t$, formed upon or attached to the upper end of the upright shaft $u$. The shaft $u$ rocks in bearings attached to a post of the frame A, and upon its lower end is formed, or to it is attached, a rearwardly-projecting crank, $v$, to which is hinged the projecting outer end of a rod, $w$, attached to the cleaner-shoe $o$, so that the said shoe will be vibrated transversely by the longitudinal vibration of the conveyer $n$. The cleaner-shoe $o$ is suspended from the frame or casing of the machine by hinged bars $x$, as shown in Fig. 2, and in such a position that the grain, while passing into and through the machine, will be fully exposed to the air-blast from the fan-blower $k$ $l$ $m$.

To the cranks Y are pivoted the upper ends of the connecting-bars $y$, the lower ends of which are pivoted to the cranks $z$, attached to the ends of the shaft 1. The shaft 1 revolves in bearings in the lower rear part of the frame A, and is designed to carry and give motion to the carrier of the straw-stacker. The shaft 1 also passes through the lower end of the elevator 2, and carries and gives motion to the lower roller of the said elevator. The cleaner-shoe $o$ is designed to be provided with screens in the ordinary manner, which screens are not shown in the drawings, as there is nothing new in their construction. The bottom of the cleaner-shoe is inclined to conduct the cleaned grain to the spout 3, through which it passes to a suitable receiver.

In the upper rear end of the inclined bottom of the cleaner-shoe $o$ is formed a trough or spout, 4, to receive the unthrashed heads of grain from the separator, the tailings from the cleaner, and the grain from the apron $c$, and guide them into the elevator 2, from the upper end of which they are discharged into the spout 5, and slide down the said spout to the feed-apron of the thrasher, to again pass through the machine.

To the upper end of the spout 5 are attached guide-rods 6, which pass through guides 7, attached to the upper part of the elevator 2.

To a hanger, 8, attached to the lower part of spout 5, is attached a guide-rod, 9, which passes through a guide-hole in a stud, 10, or other support attached to the frame or casing of the machine.

To a journal of the upper roller of the elevator 2 is attached a crank or crank-wheel, 11, to which is hinged one end of a connecting-rod, 12. The other end of the connecting-rod 12 is attached to the spout 5, so that the said spout will be vibrated longitudinally by the movement of the elevator.

It will be seen that in my construction all the parts of the machine, from the thrashing-cylinder to the elevator, with the exception of the gearing R S and $e$, designed to impart motion to the beater and crank T of the separator, are operated by crank-shafts, connecting-links, and levers, which communicate rotary motion from one to the other, dead-points in the movement being prevented or overcome by arranging the cranks at opposite sides of the machine at an angle to each other.

Having thus fully described my invention, I claim as new and desire to secure by Letters Patent—

1. In a grain thrasher and separator, the combination, with the gears R S and $e$, of a series of cranks and levers connecting said gears, the separator, the conveyer, the fan-blower, and elevator, said cranks at the opposite ends of each shaft being arranged at an angle with each other, substantially as shown and described.

2. The combination, with the crank-shafts T W, and separator V, provided with perforated offsets $a$ $a'$, slats $b$, inclined apron $c$, and bearings U, of the suspended conveyer $n$, having screen $q$, connecting-bar $r$, cleaner-shoe $o$, and fan-blower $k$ $l$ $m$, substantially as shown and described.

3. In a combined grain thrasher and separator, the combination, with the crank-shaft W and the elevator-shaft 1, of the cranks Y $z$ and the connecting-rods $y$, the cranks Y and $z$ on the ends of each shaft W and 1 being at an angle with each other, substantially as herein shown and described, whereby the elevator will be driven by the movements of the separator, as set forth.

4. In a combined grain thrasher and separator, the combination, with the journals of the beater $d$, and the shaft $k$, of the fan-blower cranks $ff$, connecting-bars $gi$, and the pivoted levers $h$, the cranks on the opposite ends of the beater and also of the fan-blower shafts being arranged at an angle to each other, substantially as herein shown and described, whereby the fans will be driven from the beater, as set forth.

WILLIAM LEONARD MULLER.

Witnesses:
JOSEPH RUNGE,
W. S. MANNING.